United States Patent Office 3,801,523
Patented Apr. 2, 1974

3,801,523
PROCESS FOR PREPARING SYNTHETIC LATEX
Eiichiro Shiratsuchi and Eijiro Tagami, Yokkaichi, Japan, assignors to Japan Synthetic Rubber Co., Ltd., Tokyo, Japan
No Drawing. Continuation-in-part of application Ser. No. 10,012, Feb. 9, 1970. This application Aug. 18, 1971, Ser. No. 172,937
Int. Cl. C08f 1/13
U.S. Cl. 260—29.6 RW          8 Claims

ABSTRACT OF THE DISCLOSURE

A synthetic latex is prepared by the emulsion polymerization of an ethylenically unsaturated monomer in 100–300 parts by weight of an aqueous alkaline solution containing 2–20% by weight of a copolymer in the presence of a free radical initiator to form 100–200 parts by weight of polymer of the ethylenically unsaturated monomer, the copolymer being composed of not lower than 7% by weight and less than 20% by weight of an ethylenically unsaturated monobasic carboxylic acid having not higher than 10 carbon atoms and the remaining percentage of a monomer copolymerizable therewith, and having intrinsic viscosity of less than 0.2 determined in dimethyl formamide as solvent at 25° C.

---

This is a continuation-in-part of application Ser. No. 10,012, filed Feb. 9, 1970, now abandoned.

This invention relates to a process for preparing synthetic latex, more particularly, to a process for preparing synthetic latex by polymerizing an ethylenically unsaturated monomer in an aqueous alkaline solution of a polymer having low content of carboxyl group.

It is well known that among copolymers of an unsaturated carboxylic acid such as acrylic acid, methacrylic acid, maleic acid and the like with a monomer such as styrene, vinyl acetate, butadiene and the like, a copolymer of high content of unsaturated carboxylic acid is soluble in an aqueous alkaline solution and an ethylenically unsaturated monomer can be polymerized in such an aqueous alkaline solution.

However, when an ethylenically unsaturated monomer is polymerized in such an aqueous alkaline solution of a copolymer having high content of unsaturated carboxylic acid, there is often formed coagulum and the resulting dry film is not sufficiently waterproof.

It is an object of this invention to provide a process for producing a synthetic latex capable of forming a dry film of high water-resistance.

It is another object of this invention to provide a process for producing a synthetic latex having high mechanical stability.

It is a further object of this invention to provide a process for producing stably a synthetic latex by an emulsion polymerization without forming coagulum.

According to the present invention, a synthetic latex may be produced by the emulsion polymerization of an ethylenically unsaturated monomer in 100–300 parts by weight of an aqueous alkaline solution containing 2–20% by weight of a copolymer in the presence of a free radical initiator to form 100–200 parts by weight of polymer of the ethylenically unsaturated monomer.

The copolymer is composed of not lower than 7% by weight and less than 20% by weight of an ethylenically unsaturated monobasic carboxylic acid having not higher than 10 carbon atoms and the remaining percentage of a monomer copolymerizable therewith, and has an intrinsic viscosity of less than 0.2 determined in dimethyl formamide as solvent at 25° C. The content of the ethylenically unsaturated monobasic carboxylic acid is preferably 9–18% by weight. When more than one ethylenically unsaturated monomer are used in this invention, the emulsion "polymerization" as mentioned above also includes "copolymerization."

Representative polymers soluble in an aqueous alkaline solution employed in this invention are copolymers of an unsaturated carboxylic acid such as monobasic acid, for example, acrylic acid, methacrylic acid, crotonic acid, vinyl benzoic acid, and isopropenyl benzoic acid, and monoesters of dibasic acid, for example, fumaric acid, maleic acid, and itaconic acid with a monomer copolymerizable therewith such as conjugated diolefin, for example, butadiene, isoprene, dimethyl butadiene and chloroprene, and monoolefin, for example, vinyl chloride, vinylidene chloride, ethylene, isobutylene, styrene, vinyltoluene, α-methylstyrene, acrylonitrile, methacrylonitrile, acrylamide, methacrylamide, hydroxyethyl methacrylate, hydroxypropyl methacrylate, other methacrylic acid esters, acrylic acid esters, vinyl pyridine, vinylquinoline and vinyl carbazole.

A part of the ethylenically unsaturated monobasic acid may be replaced by ethylenically unsaturated dibasic acid such as fumaric acid, maleic acid and itaconic acid.

The copolymer having low content of the ethylenically unsaturated monobasic carboxylic acid, soluble in an aqueous solution and having low intrinsic viscosity is preferably produced in a solvent such as alcohol or solvent predominantly containing an alcohol as disclosed in Japanese Pat. No. 545,491.

When the content of the unsaturated carboxylic acid in the copolymer is less than 7% by weight, the copolymer is not easily soluble in an alkaline solution. When the content of the unsaturated carboxylic acid in the copolymer is higher than 20% by weight, water resistance of the dry film of the resulting synthetic latex becomes low. Further, intrinsic viscosity (determined in dimethyl formamide as solvent at 25° C.) of the copolymer not less than 0.2 results in lowering the solubility of the copolymer not less than 0.2 results in lowering the solubility of the copolymer in an aqueous alkaline solution.

Representative alkaline materials used in this invention for producing the aqueous alkaline solution may be alkali metal hydroxide such as sodium hydroxide, potassium hydroxide, and the like, ammonia, and water soluble organic amine such as methyl amine, ethyl amine, dimethyl amine, diethyl amine, monoethanolamine, diethanolamine and the like.

When the content of the copolymer in the aqueous alkaline solution used for the polymerization system is less than 2% by weight, the effect of the present invention is lowered, and when the content of the copolymer in the aqueous alkaline solution is higher than 20% by weight, viscosity of the resulting latex becomes high and such high content is not preferable from an economical point of view.

When an ethylenically unsaturated monomer is polymerized in 100–300 parts by weight of an aqueous alkaline solution containing 2–20% by weight of the above-mentioned copolymer and the polymer thus obtained becomes more than 200 parts by weight, the viscosity of the resulting synthetic latex increases disadvantageously to a large extent. On the contrary, it is not economical that the amount of the polymer thus produced is lower than 100 parts by weight.

The polymerization according to this invention may be effected in the presence of a conventional emulsifier (surfactant), for example, in an amount less than 6% by weight. The effect of this invention, i.e. stable production of a synthetic latex capable of forming a water-resistant dry film, is particularly remarkable when 6–20 parts by weight of the copolymer containing an unsaturated carboxylic acid is used for 100 parts by weight of the resulting polymer and a conventional emulsifier (surfactant) is not substantially used.

As the free radical initiator, there may be used hydrogen peroxide, alkali metal derivatives of hydrogen peroxide such as sodium peroxide, potassium peroxide and the like, and persulfates such as potassium persulfate, sodium persulfate, ammonium persulfate and the like. The polymerization temperature when such initiators are employed preferably ranges from 30° to 80° C., and particularly preferred is from 40° to 70° C.

As representative ethylenically unsaturated monomer employed in this invention, there are mentioned, for example, aromatic vinyl compounds such as styrene, vinyltoluene, and α-methylstyrene, vinyl cyanide such as acrylonitrile and methacrylonitrile, ester of unsaturated monobasic carboxylic acid such as methyl, ethyl, butyl and octyl acrylates and methacrylates, conjugated diolefin such as butadiene, isoprene and chloroprene, acrylamide, methacrylamide, methyl vinyl ketone, and lower aliphatic monoolefin such as ethylene, propylene and isobutene.

In the present invention, one or more ethylenically unsaturated monomers may be used and therefore, "polymerization" of the ethylenically unsaturated monomer may include copolymerization as well as homopolymerization.

The following examples are given to illustrate embodiments of the invention as it is presently preferred to practice it. It will be understood that these examples are illustrative, and the invention is not to be considered as restricted thereto except as indicated in the appended claims. Parts and percentages in the Examples are by weight unless otherwise specified.

agulate the copolymer followed by washing with water and steam distillation to remove the remaining monomers, and then dissolved in an aqueous alkaline solution as above.

The results are shown in Table 1 below.

It is clear from the following Table 1 that alkali salts of the resulting copolymer containing less than 7% by weight of unsaturated carboxylic acid is hardly soluble in water and when the content of unsaturated carboxylic acid is low and the intrinsic viscosity is not lower than 0.2, the alkali salts of the resulting copolymer is hardly soluble in water.

TABLE 1

|  | 1 | 2 | 3 | 4 | 5 | 6 | 7 | 8 | 9 |
|---|---|---|---|---|---|---|---|---|---|
| Composition (percent): |  |  |  |  |  |  |  |  |  |
| Butadiene |  |  | 25 | 29.5 |  | 30 |  |  |  |
| Styrene | 20 | 20 | 40 |  | 20 |  | 20 | 20 | 20 |
| Methyl methacrylate | 74 | 72 | 25 | 59.5 | 68 | 57 | 65 | 62.5 | 61 |
| Methacrylic acid | 6 | 8 | 10 | 11.0 | 12 | 13 | 15 | 17.5 | 19 |
| Tertiary dodecyl mercaptan (parts) |  |  | 5.0 | 5.0 |  | 5.0 |  |  | 2.0 |
| n-Dodecyl mercaptan (parts) | 3.0 | 3.0 |  |  | 3.0 |  | 3.0 | 2.0 |  |
| Azobisisobutyronitrile (parts) |  |  | 2.0 | 2.0 |  | 2.0 |  |  | 3.0 |
| Hydrogen peroxide, 30% solution (parts) |  |  | 15 | 15 |  | 10 |  |  |  |
| Benzoyl peroxide (parts) | 3.0 | 3.0 |  |  | 3.0 |  | 3.0 | 3.0 |  |
| Methanol (parts) | 50 | 50 | 50 | 50 | 50 | 50 | 50 | 50 | 50 |
| Conversion (percent) | 98.0 | 99.4 | 95.5 | 96.8 | 95.5 | 95.8 | 98.0 | 98.5 | 96.0 |
| [η] in dimethyl formamide at 25° C | 0.09 | 0.09 | 0.28 | 0.15 | 0.10 | 0.18 | 0.10 | 0.16 | 0.19 |
| Alkali in aqueous alkaline solution | NH₄OH | NH₄OH | NaOH | NaOH | NH₄OH | NaOH | KOH | NH₄OH | NH₄OH |
| Solubility in water | Insoluble | Soluble | Poor | Soluble | Soluble | Soluble | Soluble | Soluble | Soluble |

EXAMPLE 2

6–20 parts of a copolymer containing an unsaturated carboxylic acid prepared in a way similar to Example 1, 94–80 parts of a mixture of ethylenically unsaturated monomers, 80–200 parts of an aqueous alkaline solution, 0–0.5 part of disodium phosphate, 0.1–0.8 part of hydrogen peroxide, and 0.2–0.4 parts of tertiary dodecyl mercaptan were charged in a reactor and polymerized at 40–50° C. until the conversion became higher than 95%. In Table 2 below are shown the properties of latex thus produced.

The percentage of the formed coagulum listed in Table 2 is is calculated according to the following formula:

$$\text{Coagulum formed percent} = \frac{W}{S} \times 100\%$$

where W is a weight of coagulum (g.) collected on a 120-mesh stainless screen and S is a weight (g.) of polymer (as solid) in a sample latex.

TABLE 2

|  | 1 | 2 | 3 | 4 | 5 | 6 | 7 | 8 |
|---|---|---|---|---|---|---|---|---|
| Composition of copolymer containing unsaturated carboxylic acid (percent): |  |  |  |  |  |  |  |  |
| Styrene | 20 | 20 | 20 | 20 | 20 | 30 | 20 | 20 |
| Methyl methacrylate | 72 | 71 | 67 | 65 | 65 | 52.5 | 61 | 61 |
| Methacrylic acid | 8 | 9 | 13 | 15 | 15 | 17.5 | 19 | 19 |
| Alkali in aqueous alkaline solution | NH₄OH | NH₄OH | NH₄OH | KOH | NH₄OH | NH₄OH | NH₄OH | NH₄OH |
| (η) in dimethyl formamide at 25° C | 0.09 | 0.10 | 0.10 | 0.10 | 0.10 | 0.13 | 0.19 | 0.11 |
| Amount of copolymer used (parts) | 12 | 10 | 10 | 11 | 8 | 9 | 7 | 6 |
| Butadiene (parts) | 20 | 20 | 20 | 20 | 20 | 20 | 20 | 20 |
| Styrene (parts) | 68 | 70 | 70 | 69 | 72 | 71 | 73 | 74 |
| Tertiary dodecyl mercaptan (parts) | 0.4 | 0.4 | 0.4 | 0.2 | 0.2 | 0.4 | 0.4 | 0.4 |
| Disodium phosphate (parts) | 0.5 | 0.5 | 0.2 | 0 | 0.2 | 0.5 | 0.3 | 0.2 |
| Hydrogen peroxide (parts) | 0.8 | 0.8 | 0.3 | 0.1 | 0.1 | 0.8 | 0.6 | 0.6 |
| Water (parts) | 80 | 80 | 80 | 80 | 80 | 80 | 80 | 80 |
| Reaction time (hrs.) | 20 | 25 | 22 | 12 | 15 | 20 | 16 | 20 |
| Reaction temperature (° C.) | 45 | 40 | 40 | 50 | 50 | 45 | 40 | 40 |
| Conversion (percent) | 100 | 98.5 | 97.6 | 96.5 | 95.0 | 94.4 | 99.0 | 95.6 |
| pH | 10.0 | 10.4 | 9.8 | 9.3 | 9.7 | 10.2 | 9.5 | 10.5 |
| Coagulum formed (percent) | 0.0022 | 0.0076 | 0.0171 | 0.0064 | 0.0552 | 0.0054 | 0.0067 | 0.0232 |
| Mechanical stability | Excellent | Excellent | Excellent | Excellent | Excellent | Excellent | Excellent | Excellent |
| Fluidity | Good | Good | Good | Good | Good | Good | Good | Good |

EXAMPLE 1

One hundred parts of a mixture of an unsaturated carboxylic acid and a monomer copolymerizable therewith, 50 parts of methanol, a catalyst, and an appropriate amount of tertiary dodecyl mercaptan of n-dodecyl mercaptan were charged in a reactor and copolymerized at 70° C. until the conversion became higher than 95%. Then the resulting copolymer solution was directly dissolved in an aqueous alkaline solution substantially equivalent to the unsaturated carboxylic acid, or the resulting copolymer solution was firstly poured into water to co-

EXAMPLE 3

6–20 parts of a copolymer containing an unsaturated carboxylic acid prepared in a way similar to Example 1, 94–80 parts of a mixture of ethylenically unsaturated monomers, 80–200 parts of an aqueous alkaline solution, 0.5 part of potassium persulfate (or 0.5 part of ammonium persulfate), 0.3–0.5 part of disodium phosphate, and 0.2 part of tertiary dodecyl mercaptan were charged in a reactor and polymerized at 40–50° C. until the conversion became higher than 95%. In Table 3 below are shown properties of the resulting latex. The percentage of the formed coagulum listed in Table 3 is that calculated as described in Example 2 above.

TABLE 3

| Composition of copolymer containing unsaturated carboxylic acid (percent): | 1 | 2 | 3 | 4 | 5 | 6 | 7 | 8 | 9 | 10 | 11 | 12 |
|---|---|---|---|---|---|---|---|---|---|---|---|---|
| Butadien | 29.5 | 30 | 30 | 30 | | | | | | | | |
| Styrene | 59.5 | 58 | 55 | 55 | 20 | 20 | 20 | 20 | 30 | 20 | 20 | 20 |
| Methyl methacrylate | 11 | 12 | 15 | 15 | 72 | 71 | 65 | 65 | 52.5 | 61 | 66 | 67 |
| Methacrylic acid | | | | | 8 | 9 | 15 | 15 | 17.5 | 19 | 14 | 13 |
| Alkali in aqueous alkaline solution | NaOH | NaOH | NH₄OH | NH₄OH | NH₄OH | NH₄OH | KOH | NH₄OH | NaOH | KOH | NH₄OH | NH₄OH |
| [η] in dimethyl formamide at 25° C | 0.15 | 0.14 | 0.12 | 0.05 | 0.09 | 0.10 | 0.10 | 0.10 | 0.13 | 0.11 | 0.09 | 0.10 |
| Amount of copolymer used (parts) | 17.5 | | | | 12 | 10 | 11 | 8 | 9 | 6 | 11 | |
| Butadiene (parts) | 37 | 20 | 12 | 20 | 20 | 20 | 20 | 20 | 20 | 20 | 20 | ²20 |
| Styrene (parts) | 55.5 | 32 | 35.2 | 32 | 68 | 70 | 69 | 72 | 71 | 74 | ³69 | 69 |
| Tertiary dodecyl mercaptan (parts) | 0.2 | 0.2 | 52.8 | 0.2 | 0.2 | 0.2 | 0.2 | 0.2 | 0.2 | 0.2 | 0.2 | 0.2 |
| Potassium persulfate (parts) | 0.5 | 0.5 | 0.2 | 0.5 | 0.5 | 0.5 | 0.3 | 0.5 | 0.3 | 0.3 | 0.3 | 0.5 |
| Ammonium persulfate (parts) | | | 0.5 | 0.5 | 0.3 | 0.5 | 80 | 0.3 | 80 | 200 | 80 | 0.3 |
| Disodium phosphate (parts) | 0.5 | 0.5 | 80 | 200 | 80 | 80 | 12 | 80 | 25 | 25 | 20 | 100 |
| Water (parts) | 100 | 100 | 40 | 40 | 20 | 20 | 50 | 15 | 40 | 40 | 45 | 20 |
| Reaction time (hrs.) | 40 | 40 | 45 | 45 | 45 | 45 | | 50 | | | | 45 |
| Reaction temperature (° C.) | 45 | 45 | 94.7 | 95.8 | 97.0 | 95.5 | 98.4 | 96.0 | 98.2 | 97.4 | 98.0 | 97.0 |
| Conversion (percent) | 82.0 | 95.2 | 9.9 | 9.9 | 10.0 | 9.8 | 9.5 | 9.2 | 10.2 | 10.1 | 10.1 | 9.9 |
| pH | 10.2 | 9.8 | 0.0003 | 0.0005 | 0.0541 | 0.0036 | 0.0182 | 0.0332 | 0.0054 | 0.0032 | 0.021 | 0.055 |
| Coagulum formed (percent) | 0.0010 | 0.0005 | | | | | | | | | | |
| Mechanical stability | Excellent | Excellent | Excellent | Excellent | Excellent | Excellent | Excellent | Excellent | Excellent | Excellent | Excellent | Excellent |
| Fluidity | Good | Good | Good | Good | Good | Good | Good | Good | Good | Good | Good | Good |

¹ 2.7 parts of potassium oleate is added therto.
² Butyl acrylate is used in place of butadiene.
³ Methyl methacrylate is used in place of styrene.

EXAMPLE 4

A latex prepared by using a copolymer containing unsaturated carboxylic acid in a way similar to Example 1 and Example 2 was mixed with a portland cement at a ratio of 1 to 1 by weight to form a film. A water drop was placed on the film and the white turbidity was observed to determine the water resistance. The result is shown in Table 4.

TABLE 4

| | 1 | 2 | 3 | 4 | 5 |
|---|---|---|---|---|---|
| Composition of copolymer containing unsaturated carboxylic acid (percent): | | | | | |
| Styrene | 20 | 20 | 20 | 20 | 20 |
| Methyl methacrylate | 68 | 65 | 60 | 55 | 50 |
| Methacrylic acid | 12 | 15 | 20 | 25 | 30 |
| Alkali in an aqueous alkaline solution | NH₄OH | NH₄OH | NH₄OH | NH₄OH | NH₄OH |
| Amount of copolymer used | 10 | 10 | 10 | 10 | 10 |
| Butadiene | 40 | 40 | 40 | 40 | 40 |
| Styrene | 50 | 50 | 50 | 50 | 50 |
| White turbidity | None | None | Little | Present | Present |

A latex prepared in a way similar to Examples 1 and 2 was flown on a glass plate and allowed to stand for 24 hours at room temperature to form a transparent film. A water drop was placed on the film and a period of time during which the film becomes turbid was measured. The result is shown in Table 5 below.

TABLE 5

|  | 1 | 2 | 3 | 4 | 5 |
|---|---|---|---|---|---|
| Composition of copolymer containing unsaturated carboxylic acid (percent): |  |  |  |  |  |
| Styrene | 20 | 20 | 20 | 20 | 20 |
| Methyl methacrylate | 68 | 65 | 60 | 55 | 50 |
| Methacrylic acid | 12 | 15 | 20 | 25 | 30 |
| Alkali in aqueous alkaline solution | NH₄OH | NH₄OH | NH₄OH | NH₄OH | NH₄OH |
| Amount of copolymer used | 10 | 10 | 10 | 10 | 10 |
| Butadiene | 40 | 40 | 40 | 40 | 40 |
| Styrene | 50 | 50 | 50 | 50 | 50 |
| Period of time for becoming turbid (min.) | 80 | 70 | 50 | 47 | 12 |

A latex prepared in a way similar to Examples 1, 2 and 3 was mixed with Ca(OH)₂, amount of which was substantially equivalent to the unsaturated carboxylic acid, flown on a glass plate and dried at 120° C. for 5 minutes to form a film. A drop of a 10% aqueous solution of NaOH was placed on the film and a period of time in which the film became white turbid.

The result is shown in Table 6 below.

TABLE 6

|  | 1 | 2 | 3 | 4 | 5 |
|---|---|---|---|---|---|
| Composition of copolymer containing unsaturated carboxylic acid (percent): |  |  |  |  |  |
| Styrene | 20 | 20 | 20 | 20 | 20 |
| Methyl methacrylate | 68 | 65 | 60 | 55 | 50 |
| Methacrylic acid | 12 | 15 | 20 | 25 | 30 |
| Alkali in aqueous alkaline solution | NH₄OH | NH₄OH | NH₄OH | NH₄OH | NH₄OH |
| Amount of copolymer used | 10 | 10 | 8 | 10 | 10 |
| Butadiene | 20 | 20 | 20 | 20 | 20 |
| Styrene | 70 | 70 | 72 | 70 | 70 |
| Period of time for becoming white turbid by using 10% NaOH, hours | ¹48 | ¹48 | 24 | 20 | (²) |

¹ Not turbid.  ² 28 minutes.

It is clear from the above Tables 4–6 that a film of water resistance and alkali resistance can be obtained from a latex prepared by using the copolymer containing less than 20% by weight of unsaturated carboxylic acid.

What is claimed is:

1. A process for preparing synthetic latex which comprises the emulsion polymerization of at least one ethylenically unsaturated monomer in 100–300 parts by weight of an aqueous alkaline solution containing 2–20% by weight of a copolymer in the presence of a free-radical initiator to form 100–200 parts by weight of a polymer of the monomer, the copolymer being composed of not less than 7% and not more than 20% by weight of methacrylic acid and the remaining percentage being at least one monomer selected from the group consisting of methyl methacrylate, styrene and butadiene, having an intrinsic viscosity of less than 0.2, and being prepared in a solvent comprising an alcohol.

2. A process according to claim 1 in which the ethylenically unsaturated monomer is selected from the group consisting of aromatic vinyl compound, vinyl cyanide, acrylic ester, methacrylic ester, conjugated diolefin, lower aliphatic monoolefin, acrylamide, methacrylamide and lower alkyl vinyl ketone.

3. A process according to claim 2 in which the aromatic vinyl compound is selected from the group consisting of styrene, α-methyl styrene and vinyl toluene; the vinyl cyanide is selected from the group consisting of acrylonitrile and methacrylonitrile; the acrylic ester is selected from the group consisting of methyl acrylate, ethyl acrylate, butyl acrylate and octyl acrylate; the methacrylic ester is selected from the group consisting of methyl methacrylate, ethyl methacrylate, butyl methacrylate, and octyl methacrylate; the conjugated diolefin is selected from the group consisting of butadiene, isoprene, and chloroprene; the lower aliphatic monoolefin is selected from the group consisting of ethylene, propylene and isobutene; and the lower alkyl vinyl ketone is methyl vinyl ketone.

4. A process according to claim 1 in which the free radical initiator is a member selected from the group consisting of hydrogen peroxide, alkali metal derivatives of hydrogen peroxide, and persulfates.

5. A process according to claim 1 in which the emulsion polymerization is carried out at a temperature ranging from 30° to 80° C.

6. A process according to claim 5 the temperature ranges from 40° to 70° C.

7. A process according to claim 1 wherein said ethylenic unsaturated monomer is selected from the group consisting of styrene and butadiene.

8. A process according to claim 1 wherein said monomer which is copolymerized with methacrylic acid contains methyl methacrylate as an essential component.

References Cited

UNITED STATES PATENTS

| 3,037,952 | 6/1962 | Jordan et al. | 260—29.6 |
| 3,238,169 | 3/1966 | Wolff | 260—29.6 |
| 3,321,408 | 5/1967 | Briggs | 252—161 |

FOREIGN PATENTS

| 937,492 | 9/1963 | Great Britain | 260—29.6 RW |
| 539,277 | 4/1957 | Canada | 260—29.6 RW |

WILLIAM H. SHORT, Primary Examiner

E. A. NIELSEN, Assistant Examiner

U.S. Cl. X.R.

260—29.7 W, 29.7 UP